United States Patent [19]
Wright

[11] Patent Number: 5,732,440
[45] Date of Patent: Mar. 31, 1998

[54] LOW INSERTION FORCE GROMMET

[75] Inventor: John O. Wright, York, Pa.

[73] Assignee: Osram Sylvania Inc., Danvers, Mass.

[21] Appl. No.: 595,950

[22] Filed: Feb. 6, 1996

[51] Int. Cl.⁶ ......................................................... F16L 5/00
[52] U.S. Cl. ......................................................... 16/2.2
[58] Field of Search ................... 16/2.1, 2.2; 174/152 G, 174/153 G

[56] References Cited

U.S. PATENT DOCUMENTS

| | | | |
|---|---|---|---|
| 2,225,472 | 1/1940 | Franklin | 329/103 B |
| 2,375,373 | 5/1945 | Leathers | 173/322 |
| 2,668,316 | 2/1954 | Sturtevant et al. | 16/2.2 |
| 3,244,802 | 4/1966 | Sturtevant et al. | 174/153 |
| 3,372,960 | 3/1968 | Fisher | 308/15 |
| 3,836,269 | 9/1974 | Koscik | 16/2.2 |
| 4,041,241 | 8/1977 | Olmstead et al. | 174/153 |
| 4,685,173 | 8/1987 | Pavur | 16/2 |
| 4,905,940 | 3/1990 | Luka | 16/2.1 |
| 4,928,349 | 5/1990 | Oikawa et al. | 16/2 |
| 5,337,447 | 8/1994 | Tanaka et al. | 16/2 |
| 5,353,472 | 10/1994 | Benda et al. | 16/2 |
| 5,452,494 | 9/1995 | Wright | 16/2 |
| 5,453,579 | 9/1995 | Cohea | 16/2.2 |
| 5,499,823 | 3/1996 | Fukui | 16/2.1 |
| 5,526,549 | 6/1996 | Mori et al. | 16/2.1 |

FOREIGN PATENT DOCUMENTS 2042283  9/1980  United Kingdom ............. 174/153 G

*Primary Examiner*—Chuck Mah
*Assistant Examiner*—Donald M. Gurley
*Attorney, Agent, or Firm*—William H. McNeill

[57] ABSTRACT

A grommet for securement in a suitable aperture existing in a wall. The aperture has a diameter and the grommet comprises a body having a first portion formed to be secured to a cable which has a diameter. A flexible, second portion defines a closed chamber when the grommet is fixed to the cable, the second portion having a maximum unflexed outer dimension slightly greater than the diameter of the aperture and a maximum inner dimension substantially greater than the diameter of the cable. A third portion has a diameter substantially greater than the diameter of the aperture with a planar area between the second and third portions. An aperture engaging groove is formed in the planar area, the aperture engaging groove having a diameter substantially equal to the diameter of the aperture.

1 Claim, 3 Drawing Sheets

1

LOW INSERTION FORCE GROMMET

TECHNICAL FIELD

This invention relates generally to grommets and more particularly to sealing grommets. Still more particularly, it relates to sealing grommets for bringing a radio antenna cable through the fire wall of an automotive vehicle.

BACKGROUND ART

Prior art sealing grommets have comprised relatively massive, solid, hemispherical components of a flexible material, such as rubber. See, for example, U.S. Pat. Nos. 2,225,472 and 5,353,472. The component would be provided with a groove for engaging the automotive vehicle fire wall and an extending flange preventing pull-through. Such grommets frequently required a setting force of up to 75 lbs. As the engine compartments of modern vehicles have become more and more crowded with electronic components, it has become more difficult to find the room necessary to be able to exert such pulling force. Improved grommets having a lesser setting force have been proposed wherein the flexible portion is substantially hollow. Examples of the latter grommets are shown in U.S. Pat. Nos. 2,375,373; 3,244,802; 3,372,960; 4,041,241'4,685,173; 5,337,447; and 5,452,494. Such grommets having collapsible compartments open to the environment have been known to allow foreign matter to accumulate therewithin, making removal, when such an action is desired, very difficult.

DISCLOSURE OF INVENTION

It is, therefore, an object of this invention to obviate the disadvantages of the prior art.

It is another object of the invention to enhance sealing grommets.

It is yet another object of the invention to provide a sealing grommet with a reduced setting force.

It is another object of the invention to provide a grommet having a flexible or collapsible section that will not accumulate foreign matter in use.

These objects are accomplished, in one aspect of the invention, by a sealing grommet which is formed for securement in a suitable aperture existing in wall. The aperture has a given diameter and the grommet comprises a body having a first portion formed to be secured to a cable having a diameter. A flexible, second portion of the grommet defines a closed chamber when the grommet is fixed to the cable. The second portion has a maximum unflexed outer dimension slightly greater than the given diameter of the aperture and a maximum inner dimension substantially greater than the diameter of the cable. A third portion of the grommet has a diameter substantially greater than the given diameter of the aperture and a planar area between the second and third portions. An aperture engaging groove is formed in the planar area and the aperture engaging groove has a diameter substantially equal to the given diameter of the aperture. The closed chamber is substantially sealed whereby ingress of foreign matter is prevented. Yet, this closed chamber is readily flexible when the grommet, after being fixed to a cable, is inserted into the wall aperture. The setting force is lower than that of the solid grommets and is comparable to the setting force of the grommets having open hollow portions.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
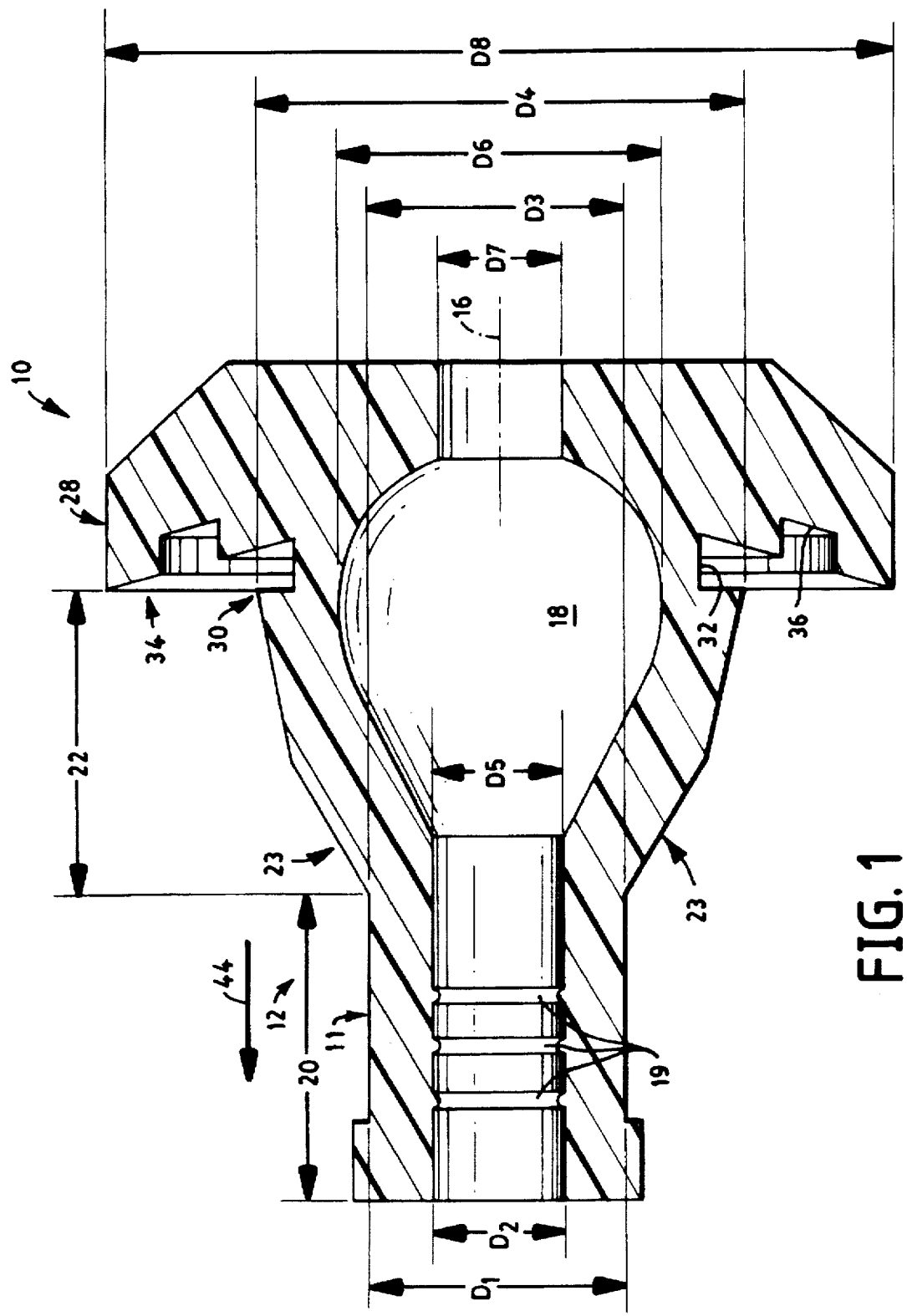
FIG. 1 is a sectional, elevational view of an embodiment of a grommet of the invention.

Referring now to the drawings with greater particularity, there is shown in FIG. 1 a grommet 10 having a body 12 of a suitable material, for example, SAE R4 15K butyl rubber, arranged along a longitudinal axis 16. The body 10 has a tubular, multi-diametered, central aperture 18 coaxial with the longitudinal axis 16. The body 10 further comprises a first portion 20 having a first outer diameter D1, a clamp receiving area 11 formed adjacent to the diameter D1, and a first inner diameter D2, which is formed to engage the outer, insulating layer of a coaxial cable 21 (see FIG. 2). A plurality of cable engaging ribs 19 are formed on the interior surface of first portion 20 to help grip the cable, especially after a clamp is installed in the clamp receiving area. A flexible, second portion 22 has a second outer diameter D3, a third outer diameter D4, a second inner diameter D5, and a third inner diameter D6, these differing diameters defining a tapered leading section 23 and a bulbous, hollow interior. In the embodiment shown, the second outer diameter D3 is equal to the first outer diameter D 1; the second inner diameter D5 is equal to the first inner diameter D2; the third outer diameter D4 is greater than the second outer diameter D3; and the third inner diameter D6 is greater than the second inner diameter D5. A third body portion 28 defines a wall engaging flange and has a fourth inner diameter D7 equal to the first inner diameter D2 and a fifth outer diameter D8 greater than the third outer diameter D4. The body 10 has an area 30 between the flexible, second portion 22 and the third body portion 28, the area 30 having a circumferential, wall engaging groove 32 formed thereabout. The difference between the fifth outer diameter D8 and the third outer diameter D4 defines a plane 34 that lies substantially orthogonal to the longitudinal axis 16. The plane 34 has a circumferential groove 36 therein which, when the grommet is properly inserted into a wall aperture, provides a suction which helps to hold the grommet in place.

Figure 2:
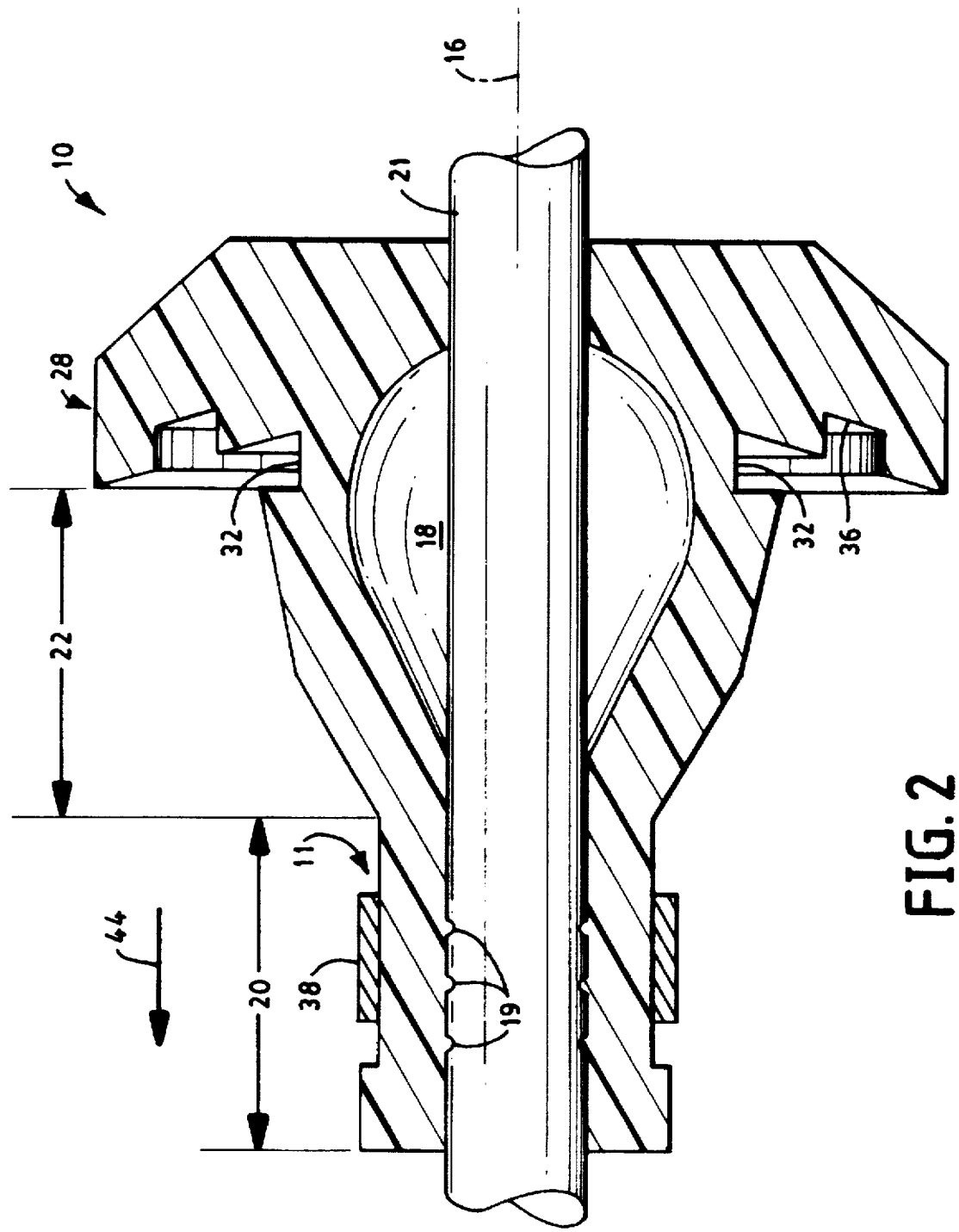
FIG. 2 is a sectional, elevational view of a grommet attached to a cable.
Figure 3:
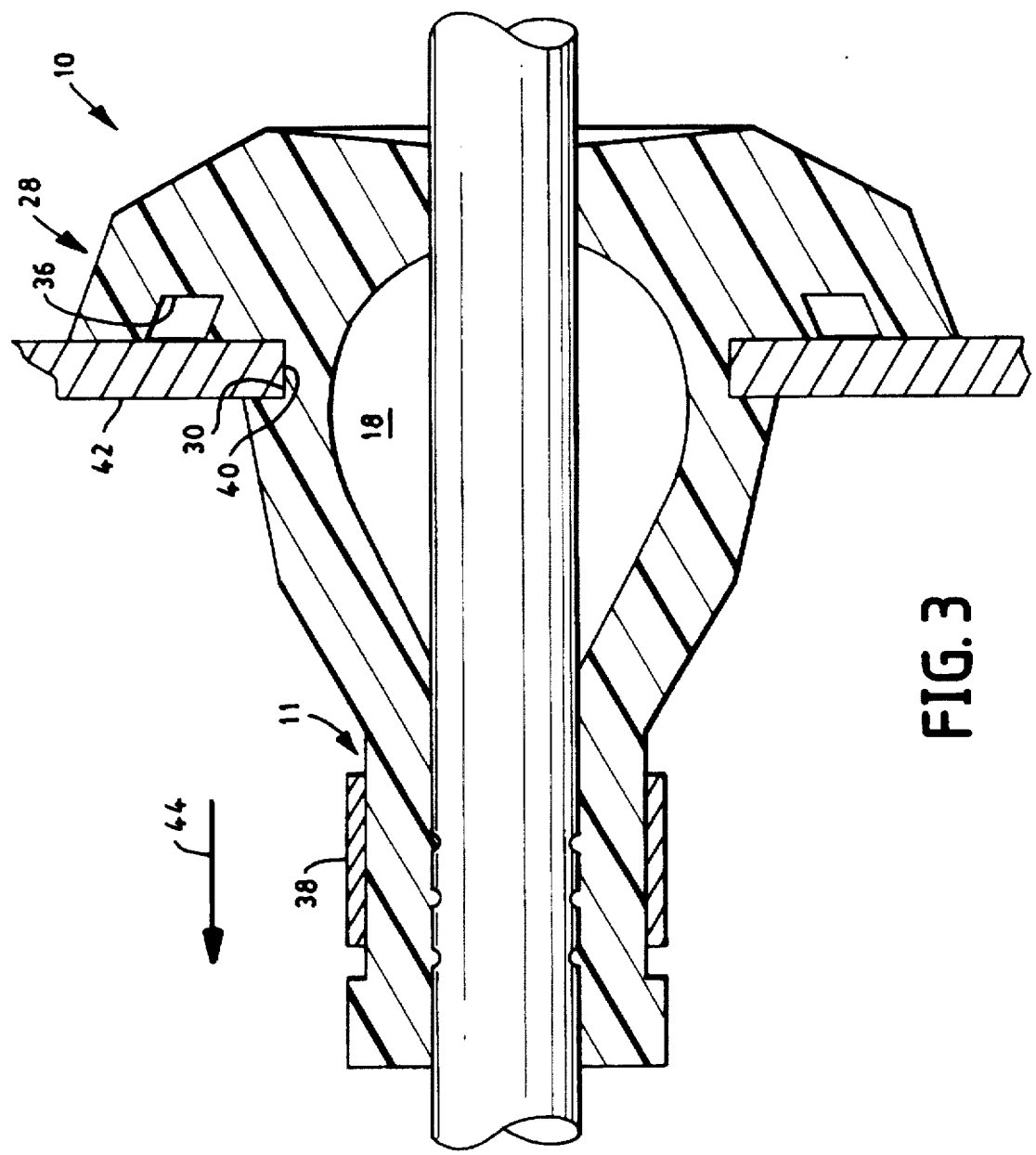
FIG. 3 is a sectional, elevational view of a grommet of the invention inserted into a receiving aperture.

Referring now to FIG. 2, grommet 10 is shown affixed to a cable 21 via a clamp 38 positioned at clamp receiving area 11. Since the fourth inner diameter D7 is equal to the first inner diameter D2, which in turn is equal to the diameter of the cable 21, the closed chamber formed by the tubular, multi-diametered central aperture 18 is substantially impervious to the entrance of foreign material and its flexibility is maintained.

With the grommet 10 affixed to the cable 21 insertion thereof into an aperture 40 in a wall 42 is accomplished by feeding a leading portion of the cable 21 through the aperture in the direction indicated by arrow 44 and pulling until groove 32 engages the aperture wall. During the insertion process the bulbous chamber formed by the multi-diametered aperture 18 collapses sufficiently to allow this to occur. Insertion stops when the third body portion 28, which comprises the flange, engages the wall 42. The angled face of the flange in cooperation with the circumferential groove 36 provides a suction seal with great holding power;

however, the insertion force remains low allowing ease of fitting even in confined areas such as the engine compartment of an automobile.

Thus, there is provided an easily inserted grommet having great holding power that is still easily removed when necessary, thanks, in part, to the continued flexibility of the closed chamber which remains free of foreign matter.

While there have been shown an described what are at present considered the preferred embodiments of the invention, it will be apparent to those skilled in the art that various changes and modifications can be made herein without departing from the scope of the invention as defined by the appended claims.

What is claimed is:

1. A grommet (10) comprising: a flexible, hollow, bulbous body arranged along a longitudinal axis and having a first portion, a third portion (28) and a central portion between said first and third portions and having a bulbous hollow interior; said first portion and said third portion having an axially aligned opening extending therethrough and adapted to snugly receive a cable therein, said first portion being elongated and having an internal surface having a plurality of cable gripping ribs formed thereon and an external surface formed to provide a clamp receiving area; said third portion having a peripheral flange extending therefrom normal to said longitudinal axis, said flange having a first angled surface facing axially toward said first portion; a first radially facing circumferential groove formed in said central portion adjacent said flange; and a second axially facing, circumferential groove (36) formed in said first surface of said flange.

* * * * *